United States Patent [19]
Ruth et al.

[11] Patent Number: 5,979,627
[45] Date of Patent: Nov. 9, 1999

[54] DAMPER ASSEMBLY

[75] Inventors: Stephen M. Ruth, Chesterfield; Sharon G. Harrison, Petersburg, both of Va.

[73] Assignee: Means Industries, Inc., Saginaw, Mich.

[21] Appl. No.: 08/988,342

[22] Filed: Dec. 10, 1997

[51] Int. Cl.[6] .............................. F16D 3/64; F16D 41/00
[52] U.S. Cl. .................. 192/55.6; 74/443; 192/69.1; 192/70.17; 192/30 V; 192/209
[58] Field of Search .......... 192/46, 55.3, 55.6, 192/69.1, 70.2, 70.17, 30 V, 209; 464/76, 73; 74/443

[56] References Cited

U.S. PATENT DOCUMENTS

| | | | |
|---|---|---|---|
| 1,467,732 | 9/1923 | Litle | 192/70.2 X |
| 1,609,448 | 12/1926 | Wemp | 192/209 X |
| 1,611,558 | 12/1926 | Reed | 192/209 |
| 1,803,937 | 5/1931 | Jansson | 192/209 |
| 1,967,322 | 7/1934 | Pearmain | 192/209 X |
| 2,925,897 | 2/1960 | Snyder | 192/70.2 |
| 4,439,053 | 3/1984 | Pelz | 74/443 X |
| 4,519,265 | 5/1985 | Dolan et al. | 192/30 V X |
| 4,613,029 | 9/1986 | Beccaris | 192/30 V X |
| 4,714,448 | 12/1987 | Focqueur et al. | 192/209 X |
| 4,938,097 | 7/1990 | Pierce | 475/72 |
| 5,224,898 | 7/1993 | Johnson et al. | 464/76 X |
| 5,419,421 | 5/1995 | Lohr | 192/30 V X |
| 5,597,057 | 1/1997 | Ruth et al. | 192/46 |
| 5,678,668 | 10/1997 | Sink | 192/46 |
| 5,816,102 | 10/1998 | Kern et al. | 464/76 X |

*Primary Examiner*—Rodney H. Bonck
*Attorney, Agent, or Firm*—Brooks & Kushman P.C.

[57] ABSTRACT

A damper assembly for use with a transmission structure having at least two spline tooth spaces. The damper assembly comprises a torque transmission plate having at least a first and second spline situated to engage the at least two splined tooth spaces and a damper element located such that when the torque transmission plate engages the transmission structure, the damper element will be compressed between the first spline and one of the at least two splined tooth spaces before the second spline engages the other of the at least two spline spaces. Accordingly, the engagement of the second spline with the other of the at least two splined tooth spaces is dampened.

28 Claims, 6 Drawing Sheets

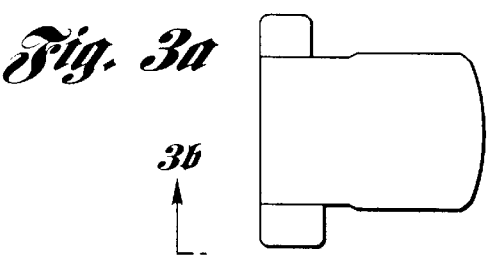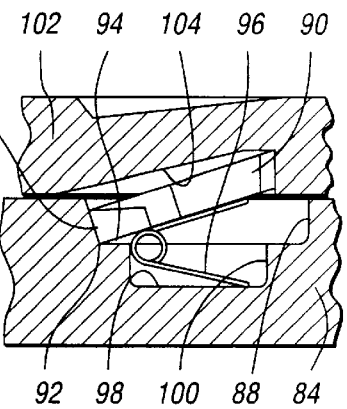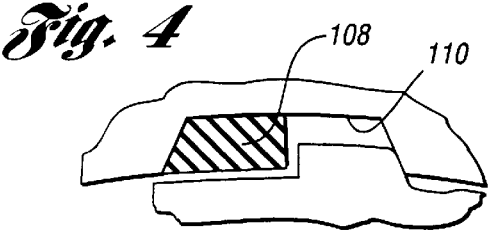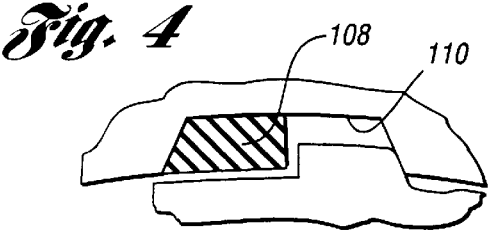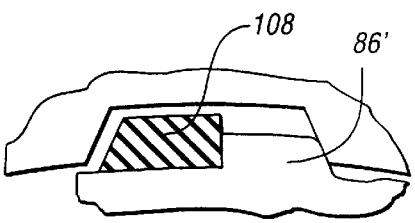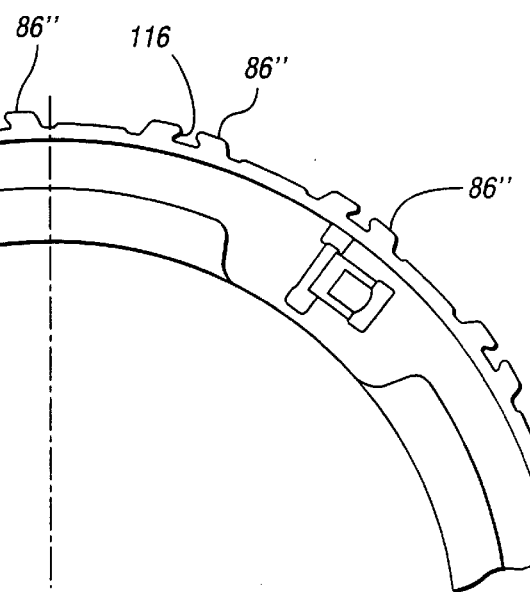

DAMPER ASSEMBLY

TECHNICAL FIELD

The invention relates to torque transmitting couplings, particularly couplings used in transmissions.

BACKGROUND OF THE INVENTION

Clutch-type plates having external or internal splines for engagement with a transmission structure, such as a housing or shell, are typically employed in vehicle transmissions. For example, such plates are used in overrunning coupling assemblies in planetary gearing for automotive transmissions to control the relative motion of the elements of the gearing in order to effect speed ratio changes. Such couplings may act as brakes for anchoring the reaction element of the gearing against rotation in one direction, while permitting rotary motion in the other direction.

An example of an overrunning coupling used as a brake for a planetary gear element in an automotive vehicle driveline may be seen by referring to U.S. Pat. No. 4,938,097 (the '097 patent) where an overrunning coupling is used to transfer planetary carrier torque to a stationary transmission case or housing. When the gearing for the transmission is conditioned for torque delivery, multiple clutches and brakes are used to establish plural torque flow paths through the gearing. When the clutches and brakes are conditioned for low-speed ratio operation, reaction torque is distributed through the overrunning coupling to the transmission housing. Upon an upshift from the lowest ratio speed to the next highest speed ratio, reaction torque on the overrunning coupling is relieved, thereby permitting rotation of the previously anchored planetary gear element. In the case of the structure shown in the '097 patent, the element that is anchored during low-speed ratio operation is the planetary carrier of one of two simple planetary gear sets.

An overrunning coupling that is capable of embodying the improvements of the present invention may be seen by referring to copending patent application Ser. No. 08/871,192, filed Jun. 9, 1997, entitled "Overrunning Planar Clutch Assembly", which is assigned to the assignee of the present invention and which is incorporated by reference.

The planar coupling assembly of the invention of the copending patent application comprises a pocket plate and a notch plate which are arranged in juxtaposed, face-to-face relationship on a common axis. The pocket plate receives a plurality of struts in angularly spaced pockets at locations equidistant from the axis of the coupling. The notch plate has recesses or notches situated at angularly spaced locations at radial positions that coincide with the radial positions of the strut pockets. The pocket plate includes springs that urge the struts into engagement with the notches or recesses in the notch plate so that torque can be transmitted between the plates in one direction, while permitting free-wheeling motion of the plates when the plates rotate relative to one another in the opposite direction.

A planar coupling assembly of the type described in the copending patent application identified above can be used in a transmission to effect underdrive speed ratio operation as driving torque is transferred to one gear element of the transmission. This causes reaction torque to be applied to a reaction element of the transmission gearing. The reaction element is connected to one of the plates of the planar coupling assembly. The companion plate of the planar coupling assembly is splined to the transmission case or housing or other torque transfer member of the transmission. When the transmission is conditioned for underdrive speed ratio operation, the struts of the planar coupling assembly then distribute torque to the transmission case or housing.

BRIEF DESCRIPTION OF THE INVENTION

The improvement of the present invention is a damper assembly for use with a transmission structure having at least two spline tooth spaces. The damper assembly comprises a torque transmission plate having at least a first and second spline situated to engage the at least two spline tooth spaces. The damper assembly further comprises a damper element located such that when the torque transmission plate engages the transmission structure, the damper element will be compressed between the first spline and one of the at least two splined tooth spaces before the second spline engages the other of the at least two spline spaces. As a result, the engagement of the second spline with the other of the at least two splined tooth spaces will be dampened so as to decrease or minimize engagement noise or engagement "clunk".

The damper element may be situated loosely within a splined tooth space. In such case, it may be desirable to include a retaining structure for retaining the damper element laterally within the tooth space. The retainer structure may include a snap-ring which engages the transmission structure adjacent the damper element.

Alternatively, the damper element may be secured to a tooth space or the first spline.

In a more specific embodiment, the first spline has a damper element such that when the torque transmission plate engages the transmission structure, the damper element will engage one of the at least two spline tooth spaces before the second spline engages the other of the at least two spline tooth spaces so as to dampen engagement of the second spline with the other of the at least two spline tooth spaces.

In such an embodiment, the first spline may have a female interlock and the damper element may have a male interlock which engages the female interlock so as to secure the damper element to the first spline. Alternatively, the first spline could have a male interlock and the damper element could have a female interlock which engages the male interlock so as to secure the damper element to the first spline.

In another alternative embodiment, the first spline may have a spline opening and the damper element may have a projection which engages the spline opening so as to secure the damper element to the first spline. In such case, the first spline may have a first side and a second side and the damper element may have two projections which engage the spline opening at the first side and the second side.

In a further alternative embodiment, the first spline may protrude into the damper element so as to secure the damper element to the first spline. In such case, the damper element may have a damper opening into which the first spline protrudes.

In another embodiment, the torque transmission plate has a plate perimeter, the first spline is foreshortened along the plate perimeter, and the damper element is secured to the torque transmission plate alongside the first spline.

In yet another embodiment, a carrier is attached to a first spline and the damper element is secured to the carrier.

In all embodiments, the damper element may be made from an energy-absorbing material such as an elastomeric-type material. Furthermore, in all embodiments, the torque transmission plate may be a pocket plate of an overrunning coupling assembly. Moreover, in all embodiments, the splines may be located along the external or internal perimeter of the torque transmission plate.

For a more specific embodiment, the improvement of the present invention may comprise a structure for cushioning the engagement of a planar coupling assembly so that the engagement of an underdrive speed ratio is not accompanied by an undesirable inertia torque as the reaction torque flow path is completed from the reaction element of the gearing to the transmission case. In the previously described embodiment, the cushioning effect will avoid engagement noise or engagement "clunk" when the transmission mechanism is shifted into a gear ratio that causes a reaction element of the gearing to rotate the associated coupling plate against the transmission case. Such engagement noise, which is an indicator of the presence of inertia torque, would be most pronounced when tolerance stack-up allows relative rotation of the torque transmitting elements of the gearing at the instant of the shift.

In such an embodiment, torsional isolator or damper elements, preferably formed of rubber or molded elastomeric material, may be secured to the periphery of one of the planar coupling elements and disposed between that planar coupling element and the transmission case or housing. In one embodiment, a spline tooth may be formed on the periphery of the stationary planar coupling plate. A spline tooth recess in the transmission case is arranged to receive an external tooth on the stationary planar coupling assembly. A rubber wedge may be located in a portion of the tooth spacing in the transmission case so that it may be engaged by the external tooth on the planar coupling assembly.

The planar coupling assembly of the invention may also be provided with pocket and notch plates that are arranged in face-to-face relationship. Strut pockets are formed in the radial face of the pocket plate and torque-transmitting struts are located in the pockets. The struts engage the notch plate as they tilt in the pockets of the pocket plate so that one-way torque transfer is effected. External teeth or lugs formed on one of the plates engage spaces on a relatively stationary case or housing. A damper or vibration isolator element is located in at least one of the spaces.

While embodiments of the invention are illustrated and described, these embodiments are not exclusive. They should not be construed to limit the claims. It is anticipated that various modifications and alternative designs may be made without departing from the scope of the invention.

BRIEF DESCRIPTION OF THE DRAWINGS

FIG. 3 is a partial cross-sectional view taken along the plane of section line 3—3 of FIG. 2;

FIG. 3a is a plan view of a torque transmitting strut that is illustrated in the cross-sectional assembly of FIG. 3;

FIG. 3b is a side view of the strut illustrated in FIG. 3a;

FIG. 4 is a partial end view of an external spline on a plate together with an isolator or damper located in a spline tooth space;

FIG. 4a shows a sectional view of FIG. 4 as seen from the plane of section line 4a—4a;

FIG. 4b is similar to FIG. 4 except showing an alternative embodiment;

FIG. 4c is similar to FIG. 4 except showing an alternative embodiment;

FIG. 5 is a portion of a plate showing one embodiment of a structure for securing isolators or dampers to the plate;

PARTICULAR DESCRIPTION OF THE INVENTION

Figure 1:
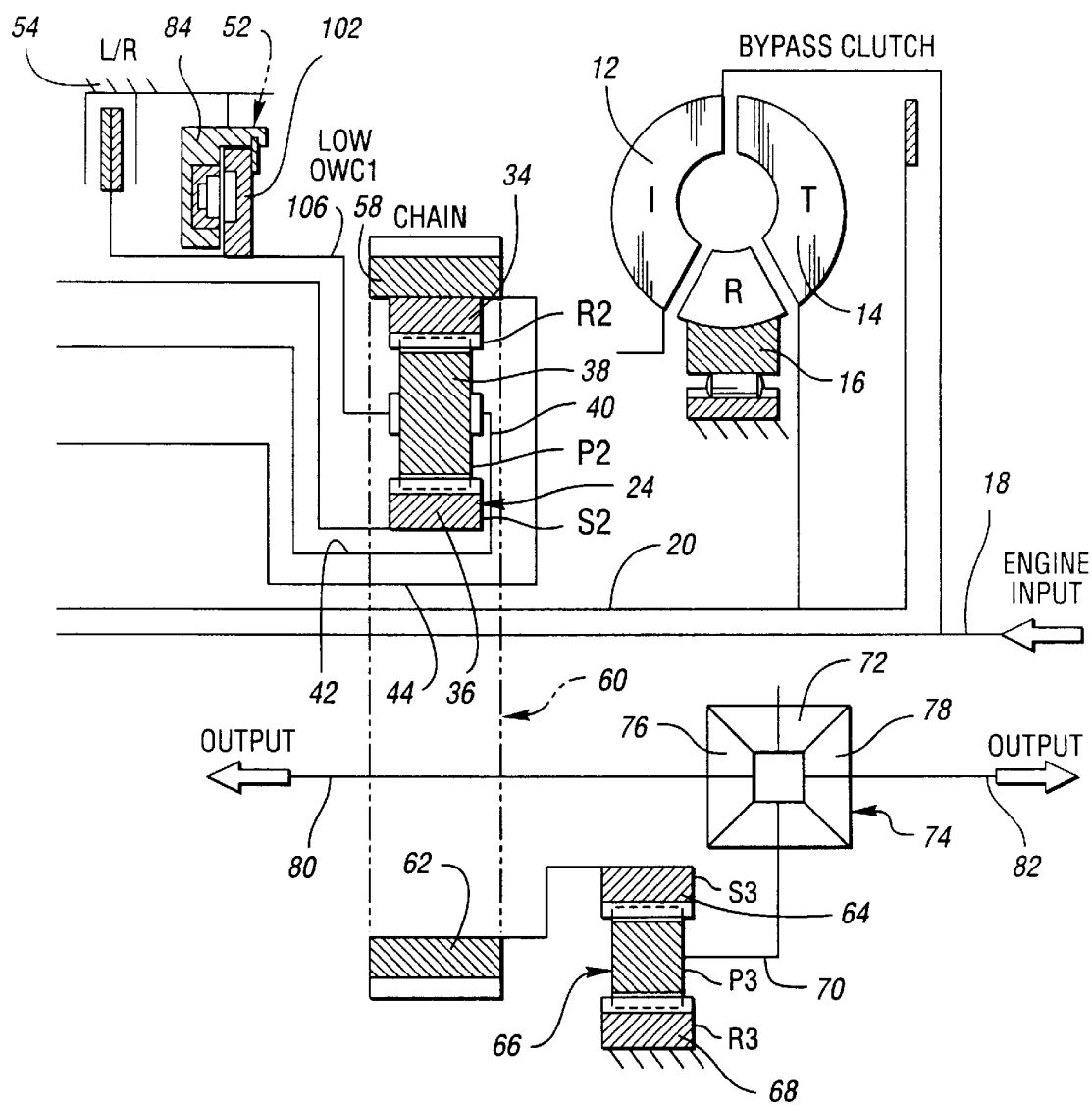
FIG. 1 is a partial schematic representation of a transmission with which the coupling of the invention may be used.

The planetary gearing for the transmission of FIG. 1 is disclosed in the aforementioned '097 patent. The transmission includes a hydrokinetic torque converter 10 with an impeller 12, a turbine 14 and a reactor or stator 16. The impeller 12 is connected to the crankshaft 18 of an internal combustion engine. The turbine 14 is connected to a torque input shaft for the gearing as shown at 20.

The transmission of FIG. 1 comprises a pair of simple planarity gear units, one of which is illustrated at 24.

Gear unit 24 comprises ring gear 34 (R2), sun gear 36 (S2), planet pinions 38 (P2) and planetary carrier 40, the latter being connected through sleeve shaft 42 to other elements of the gearing. Ring gear 34 of the gear unit 24 also is connected to other elements of the gearing through sleeve shaft 44.

During underdrive speed ratio operation, torque is delivered from the engine to the impeller 12. The turbine torque that is developed by the torque converter 10 is distributed through sleeve shaft 20 to the gearing.

The overrunning planar coupling assembly of the present invention is shown at 52. It is capable of transferring reaction torque from carrier 40 to the transmission case shown at 54. Brake L/R, when applied, bypasses coupling assembly 52 to effect reaction coast torque during underdrive speed ratio operation.

The gearing multiplies engine input torque and delivers it through sleeve shaft 44 to output ring gear 34 of the gear unit 24. Ring gear 34 is connected directly to drive sprocket 58 of a chain transfer drive 60. The driven sprocket 62 of the chain drive 60 is connected drivably to sun gear 64 (S3) of final drive gearing 66. Ring gear 68 of the final drive gearing 66 is anchored to the transmission case or housing. The carrier 70 of the final drive gear unit carries pinions that drivably engage ring gear 68.

The carrier 70 is connected to the bevel pinions 72 of differential gearing 74. Differential side gears 76 and 78 are connected respectively to torque output shafts 80 and 82, which are connected to the driving wheels of an automotive vehicle through universal drive joints in known manner.

It is apparent from FIG. 1 and the accompanying description that the planar coupling 52 of the present invention is of a relatively large diameter compared to the diameter of other torque transfer elements of the transmission. In prior art transmission constructions of the type previously described, such large diameter overrunning couplings usually are roller-type couplings or sprag-type couplings having multiple parts. The cost of such prior art couplings and the assembly time required for their manufacture and installation are greater compared to the cost and assembly time for overrunning couplings of smaller diameter. The improvements of the coupling of the present invention, however, reduces the cost and assembly time penalty notwithstanding the relatively large diameter of the coupling of the present invention, as shown at 52 in FIG. 1.

Figure 2:
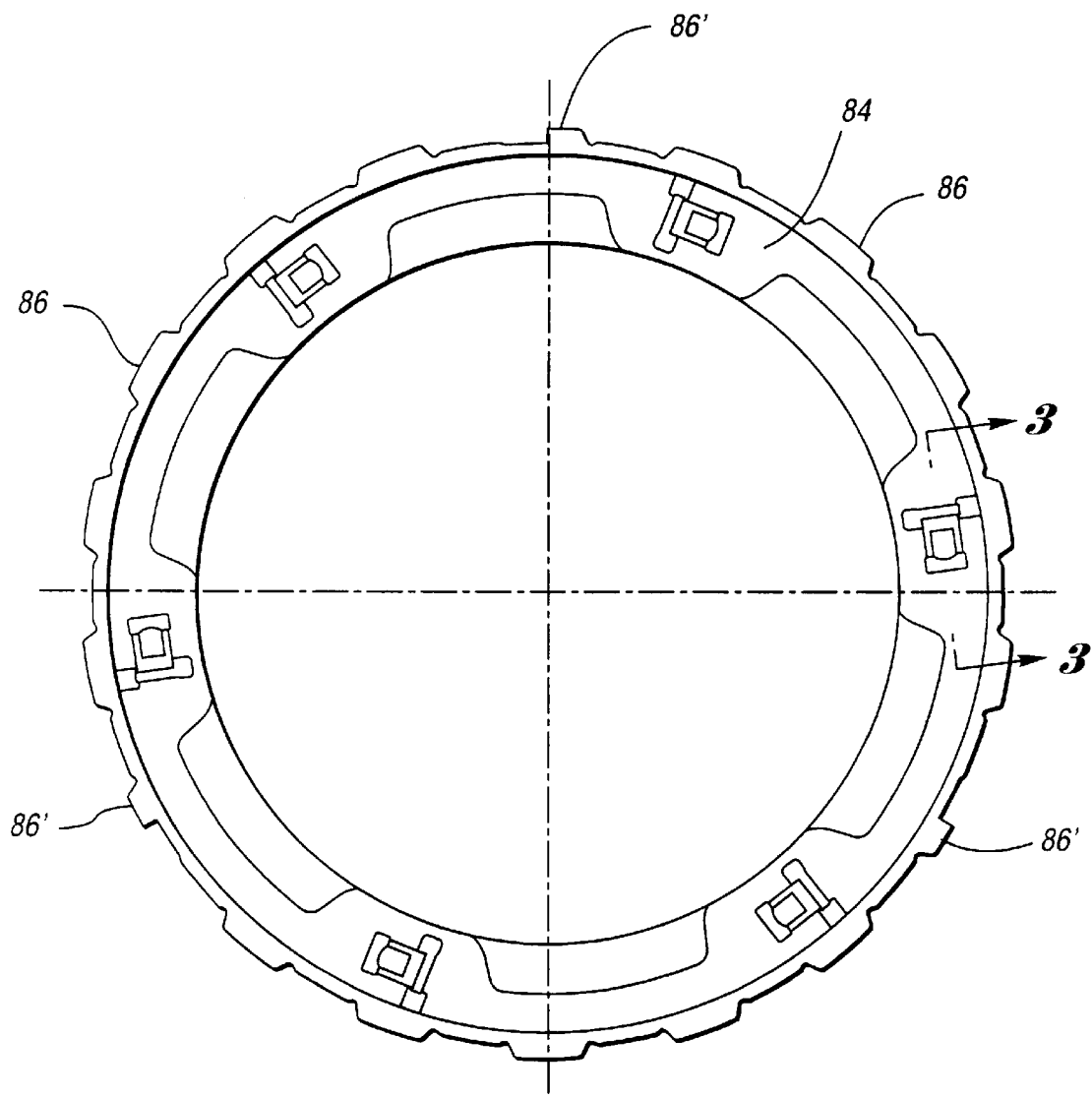
FIG. 2 is an end view of a plate which forms a part of the planar coupling assembly of this embodiment of the present invention.

Reference now will be made to FIGS. 2 and 3, as well as to the schematic view of FIG. 1, in a discussion of the overrunning coupling 52.

FIGS. 2 and 3 show a torque transmission plate which in this embodiment is a torque transmitting plate. More specifically, the torque transmitting plate in this embodiment is a pocket plate 84 of the type which may be used in the planar coupling assembly disclosed in the aforementioned copending patent application, which is incorporated by reference.

In the embodiment shown, the pocket plate 84 has a periphery with external splines, as shown at 86. As best seen in FIG. 3, in this embodiment the pocket plate 84 also has angularly spaced pockets 88. One corner of each strut 90 is pivoted, as shown at 92, on the base 94 of the pocket 88. Each strut 90 is urged in an upward direction, as viewed in FIG. 3, by a spring 96, which has two arms, one of which engages the base 98 of a spring recess 100 and the other of which engages the adjacent sprag 90.

As shown in FIG. 3, in this embodiment a notch plate 102 is mounted coaxially with respect to the pocket plate 84. It is formed with recesses or notches 104, best seen in FIG. 3, which are arranged in juxtaposition with respect to the pockets 88 and angularly situated around the common axis of the plates 102 and 84. As the springs 96 urge the struts 90 upwardly, as shown in FIG. 3, each strut is pivoted about its left edge. The opposite edge enters a recess or notch 104 in notch plate 102. Relative rotation of one plate with respect to the other is permitted by the struts, but relative motion in the opposite direction will not occur.

The plate 102 is internally splined to a transmission structure such as a drum or housing 106 which is connected to or formed as a part of the planetary carrier 40. Such drums, housings, or other structures are well known in the art. They will not be discussed in further detail here.

When the struts enter the notches or recesses 104, torque may be transmitted from the pocket plate to the notch plate. This will establish a reaction point for the carrier 40 during low-speed ratio operation. If torque in the opposite direction is applied to the carrier 40, the low-and-reverse brake 54 (L/R), previously described, will establish a torque flow path that bypasses the overrunning coupling 52, thereby permitting reverse drive operation or manual low operation. For a particular description of the mode of operation of a planar coupling in the transmission, reference may be made to the co-pending patent application incorporated by reference.

As seen in FIG. 2, one or more of the spline teeth may be formed with a reduced peripheral width. In the embodiment shown in FIG. 2, there are three such spline teeth, shown at 86', that are foreshortened in the peripheral direction. These are spaced 120° apart. Each spline tooth 86' is adapted to be received in a spline tooth space formed in the transmission housing, or other structures (not shown). Because such housings or other structures are well known in the art, they will not be discussed in further detail here.

In the embodiment shown in FIGS. 4 and 4a, a flexible isolator or damper element 108 is received loosely in the tooth space 110 of the transmission housing 111 or other structure that receives the foreshortened external spline tooth 86'. A slight clearance 112, which is exaggerated for clarity, is left between the end of the isolator or damper element 108 and the adjacent radial edge of the foreshortened spline tooth 86'. That clearance is sufficiently small so that relative angular displacement of the pocket plate 84 with respect to the housing 111 will result in a compression of the damper element 108 between the tooth space 110 and the spline tooth 86' prior to any metal-to-metal contact of the spline teeth 86 with the other spline tooth spaces so as to dampen such metal-to-metal contact and minimize noise.

As shown in FIG. 4a, in this embodiment the damper element 108 is loosely retained in the tooth space 110 of the housing 111 between retaining structures, in this embodiment a snap ring 113 and a shoulder 114 defined by the housing 111. While not shown, in lieu of a shoulder 114, a second retaining ring or other suitable retaining element could be used.

As shown in FIG. 4b, the damper element 108 could alternatively be attached to the tooth space 110 of the transmission housing. In such case, retaining structures in the housing 111 or similar structure, such as the retaining ring 113 shown in FIG. 4a, would not be required.

Alternatively, as shown in FIG. 4c, the damper element 108 could be attached to the plate 84 adjacent the spline tooth 86'. Like the embodiment shown in FIG. 4a, the dimension of the damper element 108 shown in FIGS. 4b and 4c would be such that when the damper element 108 will make contact with a spline space 110 and dampen the engagement via compression before one or more of the spline teeth 86 not having such a damper element engage other spline spaces 110.

More specifically for example, in the embodiment of FIG. 4c, the spline teeth having a damper element could have a slightly increased peripheral width along the perimeter of the plate to ensure that the one or more spline teeth having a damper element engage first and thereby dampen the metal-to-metal engagement. Alternatively, a spline tooth which together with a damper element has a peripheral width equal to or less than the spline teeth 86 could be offset so as to ensure that the damper element would be the first component to engage a tooth space, and thereby dampen contact between the spline teeth lacking a damper element and the adjacent tooth spaces.

FIGS. 5 and 5b–5e show alternate embodiments for retaining damper elements to the splines of a transmission pocket plate 84'. As in the case of the previously-described plate, the plate 84' includes external spline teeth 86". For retaining damper elements, the spline teeth 86" may include any suitable female interlock, such as a notch of generally semi-circular form, as seen at 115 in FIG 5b. FIG. 5 shows that the teeth 86", like the external teeth 86 of FIG. 2, are flat or truncated at the addendum circle, which is formed in one or a plurality of the external spline teeth 86". In another variation, the female interlock, or notch, in the spline teeth 86" may be generally triangular, as seen at 116. The spline teeth 86" may alternatively be formed instead with an interlock opening of any suitable configuration, such as triangular openings 118, circular openings 120, or rectangular openings 122 located within the radial confines of the spline teeth.

Figure 5A:
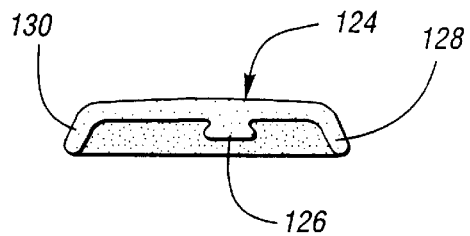
FIG. 5a is a detailed cross-sectional view of an isolator or damper that can be used with the plate illustrated in FIG. 5.
Figure 5B:
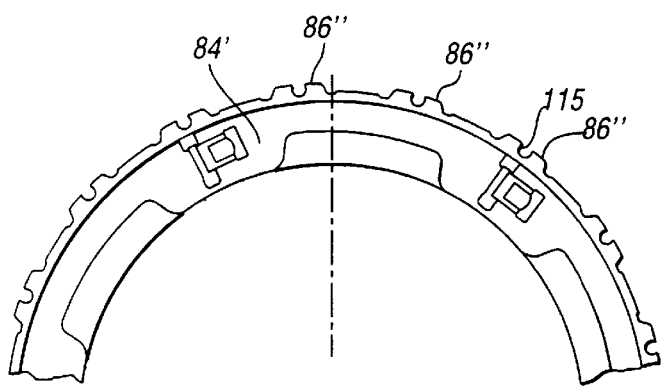
FIGS. 5b–5e show further embodiments of structures for securing isolators or dampers to the plate illustrated in FIG. 5.
Figure 5C:
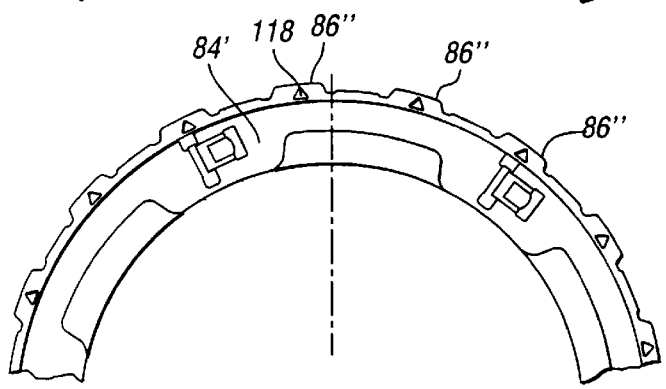
Figure 5D:
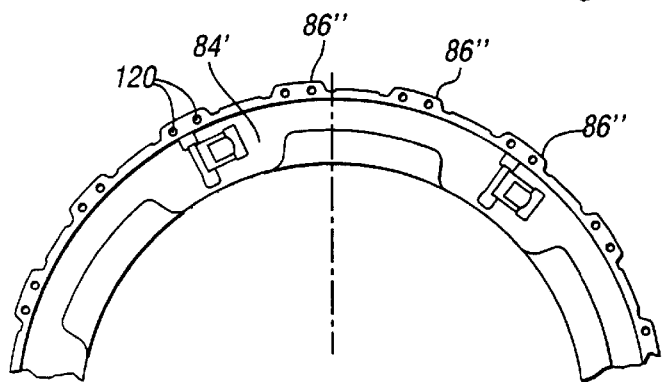
Figure 5E:
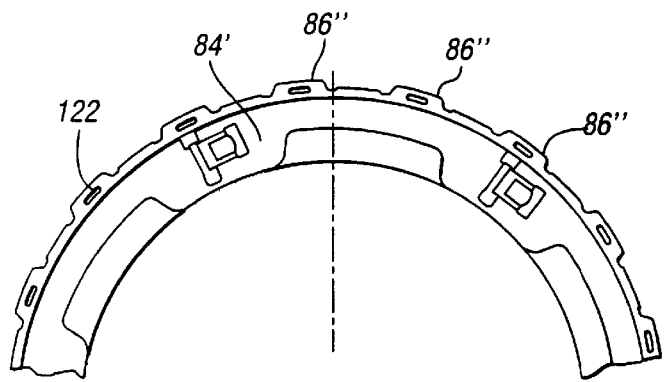

FIG. 5a shows a damper element, in this embodiment a damper element, a damper cap 124, having a male interlock formed at the radially inward side for engaging the teeth 86" of the embodiment shown in FIG. 5. While such male interlocks may have any suitable configuration, in this embodiment it is a generally trapezoidal-shaped rib 126. The ends of the cap 124, as seen at 128 and 130, overlie the edges of a tooth 86", thereby separating the tooth 86" from the sides of the corresponding tooth space formed in the transmission structure, such as a case or housing. In this embodiment, the rib 126 is adapted to be received in the female interlock, the recess 116 seen in FIG. 5, so as to secure the damper cap 124 to the tooth 86". Alternatively, a semi-circular rib or other suitably shaped rib may be formed at the radially inward side of the damper element if intended to register with a semi-circular notch 115.

Figure 8:
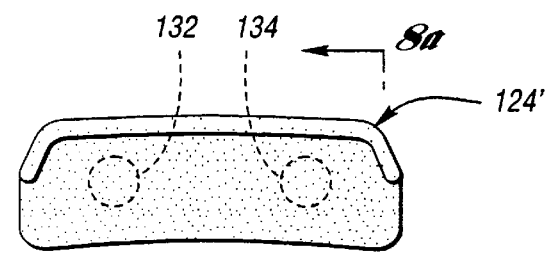
FIG. 8 shows still another alternative isolator or damper for use with the plate of FIG. 5.
Figure 8A:
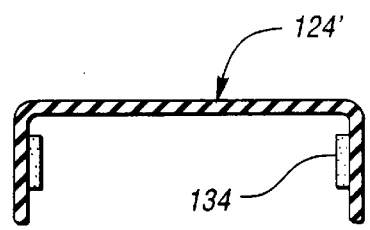
FIG. 8a shows a side sectional view of the isolator or damper of FIG. 8 as seen from the plane of section line 8a—8a of FIG. 8.

FIG. 8 shows an alternative damper element, a damper cap 124' that differs from the design shown in FIG. 5a. This embodiment includes projections 132 and 134 that engage spline openings 120 in the external spline teeth 86", such as shown in FIG. 5 so as to secure the damper cap 124' to the spline teeth 86". Alternatively, if the spline teeth have triangular openings 118, the damper cap could be formed with a triangular projection corresponding to the projections 132 and 134. Similarly, if the spline teeth have rectangular through openings 122, the damper cap projection corresponding to projections 132 and 134 could be rectangular.

Figure 7:
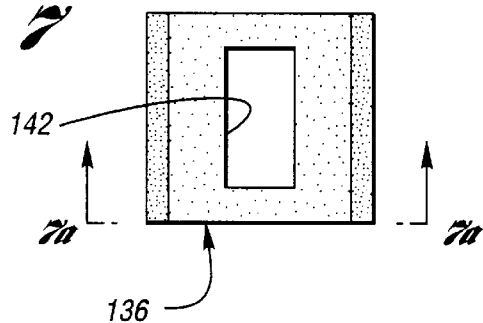
FIG. 7 shows an alternative isolator or damper design for use with a plate similar to the plate of FIG. 5.
Figure 7A:
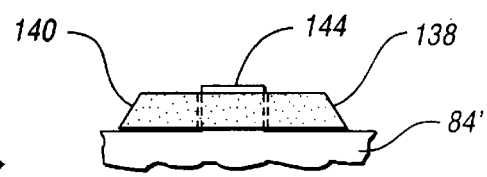
FIG. 7a is a side view of the isolator or damper design of FIG. 7 as seen from the plane of section line 7a—7a of FIG. 7.

FIGS. 7 and 7a show another alternative damper element 136. This damper element 136 is symmetrical in shape with tapered sides 138 and 140 which are adapted to engage the sides of a tooth space in a transmission structure such as a transmission housing. At the center of the damper element 136, as shown in FIG. 7, is an interlock opening. In this embodiment the interlock opening is a rectangular opening 142 which receives a shortened spline tooth 144 so as to secure the damper element 136 to the spline tooth 144. The peripheral width of damper element 136 preferably exceeds the peripheral width of the other spline teeth not having such a damper element (such teeth not shown) so that the damper element engages a corresponding tooth space prior to engagement of the other spline teeth lacking such damper element (not shown) with other tooth spaces such that the latter engagement is dampened.

Figure 6:
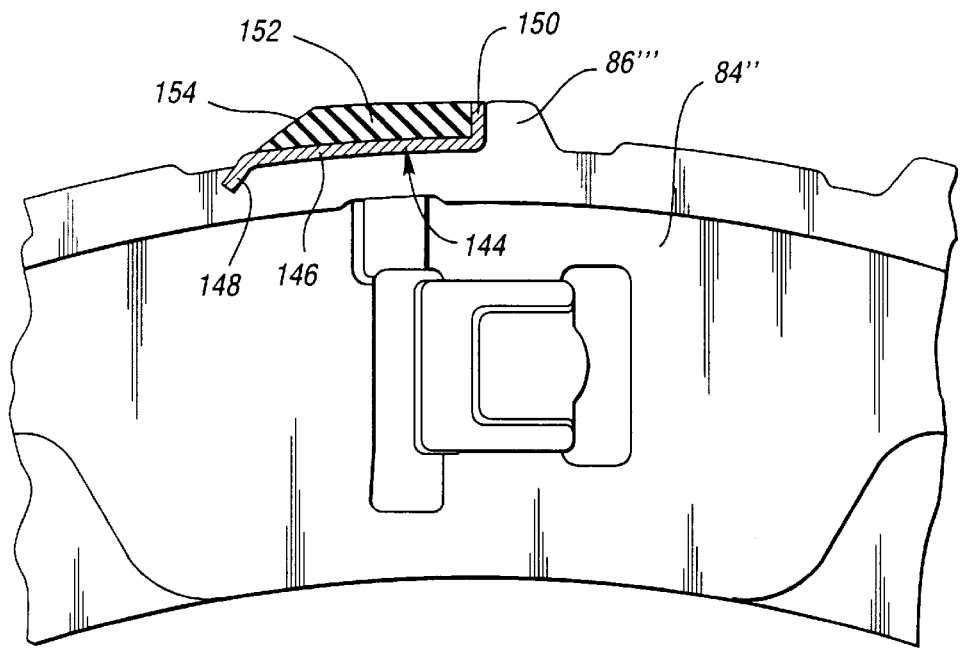
FIG. 6 shows an alternative damper or isolator for a plate similar to the plate of FIG. 5.

Shown in FIG. 6 is an alternate construction that may be used for retaining dampers to a pocket plate 84" having shortened external teeth on its periphery as seen at 86". Located at angularly spaced locations, preferably three in number, is a carrier 144, preferably formed of metal, having a base portion 146 with a radially in-turned edge 148 received in and bonded or otherwise suitably secured to a recess formed in the periphery of plate 84". At the opposite end of the carrier is an end abutment 150 which engages one side of a shortened spline tooth 86". A damper wedge 152 is bonded or otherwise suitably secured to the carrier 144. The tapered end 154 of the damper wedge 152 is positioned in a corresponding tooth space of the spline in the transmission case or housing so that it may engage the side of the tooth space prior to any metal-to-metal contact.

Figure 9:
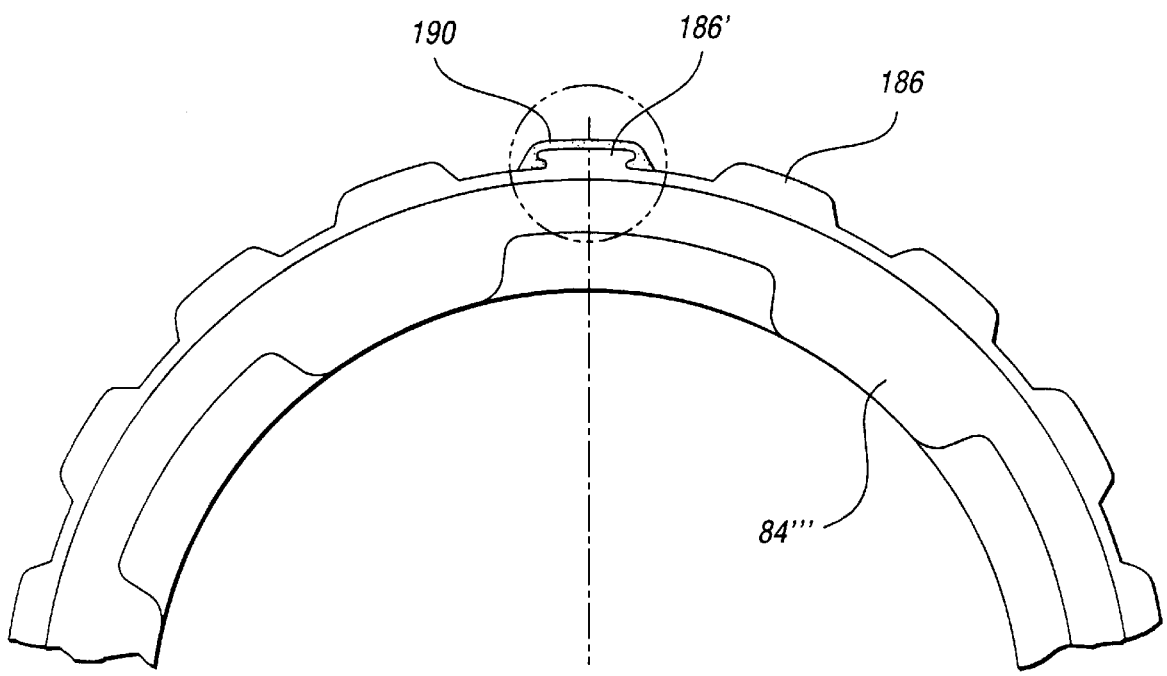
FIG. 9 is a portion of a plate showing an alternative structure for securing isolators or dampers to the plate.
Figure 9A:
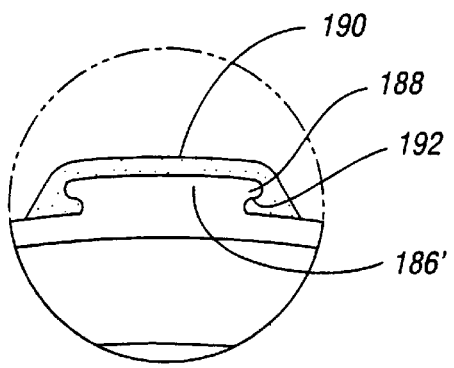
FIG. 9a is an enlargement of circled portion of FIG. 9.

FIGS. 9 and 9a show yet another alternative embodiment. In this embodiment, the spline teeth 186 of plate 84'" include one or more spline teeth 186 having a female interlock 188 designed to register with a damper element 190 having a female interlock 192. While in this embodiment the male interlock has a generally rib shape, any suitable configuration could be used. As can be seen in FIG. 9, in this embodiment the damper element 190 has a peripheral width greater than that of the spline teeth 186 for the reasons previously explained.

All of the damper elements described may be made from any suitable material, preferably an elastomer or other compressible energy-absorbing material such as rubber or "VAMAC" material supplied by DuPont Corporation and preferably having a durometer rating of approximately 70–90. It is additionally preferable that the material be capable of operating in the high temperature environment of a transmission.

In embodiments involving the attachment of a damper element to another substrate, "LOCTITE" adhesive supplied by Loctite Corporation may be suitable.

With regard to any embodiment, whether described or not, any number of damper elements could be employed about the external or internal (in the event of internal spline teeth) periphery of the transmission plate, however, it is preferred that one to three damper elements be employed about the periphery of the plate to provide damping.

While embodiments of the invention have been illustrated and described, it is not intended that disclosure illustrates and describes all modifications and all alternative designs and equivalents that fall within the scope of the following claims.

For example, it is anticipated that this invention could be used with any receiving or transmitting transmission plate having one or more spline teeth, whether external teeth as shown, or internal teeth, so as to dampen the engagement of such external or internal teeth of the torque plate with any transmission structure having tooth spaces.

As a further example, while the embodiments shown relate to pocket plates of an overrunning coupling assembly, the invention could be used with any transmission plate employing external or internal teeth for engagement with any transmission structure.

As yet another example, while spline teeth and tooth space configurations have been disclosed, any suitable configuration defining projections and recesses could be used.

What is claimed is:

1. A damper assembly for use with a transmission structure having at least two circular spline tooth spaces with tooth space sides peripherally disposed, one with respect to the other, the damper assembly comprising:

a torque transmission plate having at least first and second spline teeth situated to engage the sides of at least two spline tooth spaces; and a damper element located such that when the torque transmission plate engages the transmission structure the damper element will be compressed between the first spline tooth and a tooth space side of one of the at least two spline tooth spaces before the second spline tooth engages a side of the other of the at least two spline tooth spaces so as to dampen the engagement of the second spline tooth with a side of the other of the at least two spline tooth spaces;

the damper element being secured to the first spline tooth with a portion of the damper element engaging a side of the one of the at least two spline tooth spaces whereby the torque transmission plate is angularly located relative to the tooth spaces as the transmission plate is assembled in the transmission structure;

the sides of the other of the at least two spline tooth spaces and the second spline tooth, following assembly, having a controlled peripheral clearance therebetween, the clearances on each side of the second spline tooth being substantially equal.

2. The damper assembly of claim 1 wherein the first spline tooth has the damper element secured thereto such that when the torque transmission plate engages the transmission structure the damper element will transmit torque before the second spline tooth engages a side of the other of the at least two spline tooth spaces so as to dampen engagement of the second spline tooth with a side of the other of the at least two spline tooth spaces.

3. The damper assembly of claim 2 wherein the first spline tooth has a female interlock and the damper element has a male interlock which engages the female interlock so as to secure the damper element to the first spline tooth.

4. The damper assembly of claim 2 wherein the first spline tooth has a male interlock and the damper element has a female interlock which engages the male interlock so as to secure the damper element to the first spline tooth.

5. The damper assembly of claim 2 wherein the first spline tooth has a spline opening and the damper element has a projection which engages the spline opening so as to secure the damper element to the first spline tooth.

6. The damper assembly of claim 5 wherein the first spline tooth has a first side and a second side and the damper element has two projections which engage the spline opening at the first side and the second side of the first spline tooth.

7. The damper assembly of claim 2 wherein the first spline tooth protrudes into the damper element so as to secure the damper element to the first spline tooth.

8. The damper assembly of claim 7 wherein the damper element has a damper opening into which the first spline tooth protrudes.

9. The damper assembly of claim 2 wherein the first spline tooth has a spline perimeter and the damper element covers approximately all of the spline perimeter.

10. The damper assembly of claim 2 wherein the first spline tooth and the damper element together have a first peripheral width and the second spline has a second peripheral width less than the first peripheral width.

11. The damper assembly of claim 2 wherein the torque transmission plate has a plate perimeter, the first spline tooth being foreshortened relative to the peripheral width of the one of at least two spline tooth spaces along the plate perimeter, and the damper element is secured to the torque transmission plate alongside the first spline tooth.

12. The damper assembly of claim 2 wherein a carrier is attached to the first spline tooth and the damper element is secured to the carrier.

13. The damper assembly of claim 2 wherein the torque transmission plate is a pocket plate of an overrunning coupling assembly.

14. The damper assembly of claim 2 wherein the torque transmission plate has external spline teeth with an addendum circle and the first and second spline teeth are located along the addendum circle.

15. The damper assembly of claim 1 wherein the damper element is made from an energy-absorbing material.

16. The damper assembly of claim 15 wherein the energy-absorbing material is an elastomeric material.

17. The damper assembly of claim 1 further including a structure for retaining the damper elements laterally within the tooth space.

18. The damper assembly of claim 17 wherein the retaining structure includes a snap-ring which engages the transmission structure adjacent the damper elements.

19. The damper assembly of claim 1 wherein the torque transmission plate is a pocket plate of an overrunning coupling assembly.

20. A planar coupling assembly for use with torque delivery elements of a power transmission mechanism comprising:

coaxial pocket and notch plates with juxtaposed radial faces, strut pockets being located in the radial face of said pocket plate;

torque transmitting struts in said pockets, said struts being engageable with said notch plate whereby one-way torque transfer between said plates is effected;

first and second external spline teeth formed on one of said plates;

a relatively stationary housing surrounding said plates and having an internal spline with tooth spaces that receive said first and second spline teeth; and a damper element secured to said first spline tooth adjacent at least one side of an internal spline tooth so as to dampen torque transfer, the damper element establishing a controlled spacing between the external spline teeth and the internal spline teeth.

21. The coupling assembly of claim 20 wherein said damper element is a resilient insert located between at least one external tooth of said one plate and adjacent internal teeth of said housing, the external teeth and adjacent internal teeth having a controlled clearance therebetween established by said damper element following assembly of said one plate in said housing.

22. The coupling as set forth in claim 21 wherein said damper element includes a metal carrier located adjacent an external spline tooth of said one plate and a resilient wedge secured to said carrier, said carrier being secured to said one plate to effect a unitary coupling plate assembly.

23. The coupling assembly of claim 20 wherein said damper element is a resilient cap carried by an external tooth of said one plate, at least one end of said cap extending within a tooth space of said internal spline.

24. The coupling assembly of claim 23 wherein at least one of said caps and at least one of said external teeth have interlocking parts whereby said cap is retained on an external tooth of said one plate.

25. A planar coupling assembly comprising coaxial pocket and notch plates with juxtaposed radial faces for use in transferring torque between torque transfer elements;

strut pockets in the radial face of said pocket plate;

torque transmitting struts in said pockets, said struts being engageable with said notch plate upon tilting motion of said struts in said pockets whereby one-way torque transfer between said plates is effected;

external spline teeth on one of said plates, internal spline tooth spaces in one of said torque transfer elements receiving said external spline teeth; and a damper element secured to at least one of said external spline teeth spaces adjacent one side of an internal spline tooth space so as to dampen the engagement of the spline teeth with the internal spline teeth when one-way torque transfer between said plates is initiated;

the damper element establishing a controlled clearance between other external spline teeth and other internal spline teeth following assembly of said plates together before said torque transfer occurs.

26. The planar coupling assembly as set forth in claim 25 wherein said external projections are spline teeth and said internal recesses are spline tooth spaces.

27. A coupling plate for use with a torque transfer member in a planar coupling assembly comprising an annular clutch face, said face having angularly spaced locations that are engageable by torque transmitting struts;

damper elements mounted on the periphery of said coupling plate at angularly spaced locations;

retainer means on said periphery at said angularly spaced locations for retaining said damper elements;

said damper elements defining a portion of a driving connection between said coupling plate and a torque transfer member surrounding said coupling plate whereby engagement is dampened when torque transfer through said coupling is initiated;

said retainer means including external spline teeth, said damper elements being secured to at least one of said external spline teeth whereby said external spline teeth and said internal spline teeth have a controlled clearance following assembly of said coupling plate and said torque transfer member;

said torque transfer member having internal spline teeth with tooth spaces, one side of said tooth spaces being engageable with said damper elements whereby engagement is dampened during said torque transfer.

28. The coupling plate as set forth in claim 27 wherein said damper elements are elastomeric damper caps carried by said external spline teeth, a portion of each cap being disposed on at least one side of said external spline teeth.

* * * * *